United States Patent Office

3,730,908
Patented May 1, 1973

3,730,908
AMINE CURING AGENTS FOR POLYEPOXIDE COMPOSITIONS
James R. Harvey, Somerville, N.J., assignor to Union Carbide Corporation, New York, N.Y.
No Drawing. Original application June 22, 1970, Ser. No. 48,471. Divided and this application Aug. 9, 1971, Ser. No. 170,303
Int. Cl. C08g 30/14
U.S. Cl. 252—426    17 Claims

ABSTRACT OF THE DISCLOSURE

This invention relates to mixtures of a polyglycol polyamine and an alkylene polyamine, which when added to polyepoxides provide compositions which are useful in coating, casting or filament winding applications to form articles of desired shape, which when cured to infusible products, are characterized by excellent flexibility and toughness and by excellent surface characteristics.

---

This application is a divisional of my copending application Ser. No. 48,471, filed June 22, 1970, now U.S. Pat. 3,645,969.

This invention relates to mixtures of a polyglycol polyamine and an alkylene polyamine. More specifically, this invention relates to a mixture of a polyglycol polyamine and an alkylene polyamine which when added to a polyepoxide provides a curable, polyepoxide composition which has particular utility in coating applications providing protective coatings on surfaces such as metal and the like and also particular utility in filament winding applications to form articles of desired shape. The polyepoxide compositions, when used in the desired manner, in coating, casting or filament winding applications and cured to infusible products, are characterized by excellent flexibility and toughness and by excellent surface characteristics.

Alkylene polyamines, as for example, triethylene-tetramine, have been commonly used as curing agents to cure polyepoxides to infusible products. It has been found, however, that polyepoxide compositions, containing alkylene polyamines, when applied as protective coatings onto wood, metal and other like surfaces and cured to infusible products are hazy or cloudy in appearance and have an undesirable oily surface film. Consequently, polyepoxide compositions containing alkylene polyamines have found little, if any, utility in applications wherein clear, aesthetically attractive, protective coatings are desired. Furthermore, polyepoxide compositions containing alkylene polyamines tend to foam during the curing cycle, trapping within the compositions, air and gases evolved from the volatiles which may have been present therein. The presence of entrapped gases results in a cured product having aesthetically undesirable pits and voids.

The present invention provides a curing agent, based on a mixture of a polyglycol polyamine and an alkylene polyamine, which on being admixed with polyepoxides, provides polyepoxide compositions which on being cured have excellent flexibility and toughness. In addition, the polyepoxide compositions cure to infusible products which are blush free, that is, are free of undesirable hazy, cloudy or oily surface characteristics. Also, the compositions cure to infusible products without undergoing undesirable foaming during the curing cycle and, as a result, cure to infusible products, free of undesirable pits and voids, characterized by excellent surface characteristics.

The curing agents of this invention are a mixture of a polyglycol polyamine of Formula I or Formula II, below, in admixture with an alkylene polyamine of Formula III, also set forth below:

Formula I.—Polyglycol polyamine

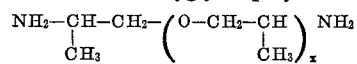

wherein $x$ has a value of 2 to about 85, preferably 2 to about 33.

Formula II.—Polyglycol polyamine

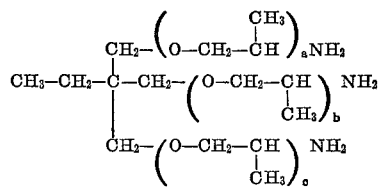

wherein $a$, $b$ and $c$ each have a value of at least 1, with the sum of $a+b+c$ being equal to 3 to about 30, preferably 3 to about 12.

Formula III.—Alkylene polyamine

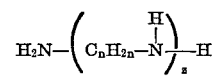

wherein $n$ is an integer of 2 to about 10 and $z$ is an integer of 1 to about 6.

The amount of polyglycol polyamine present in the mixture of amines can vary from about 35 percent by weight to about 75 percent by weight, preferably from about 40 percent by weight to about 65 percent by weight based on the combined weight of the polyglycol polyamine and the alkylene polyamine.

It is to be understood that mixtures of amines falling within the scope of Formulas I, II and III can be used if so desired.

Various amounts of the mixture of amines can be used to cure the polyepoxides to infusible products. Amounts used generally range from about 75 percent of stoichiometric to about 25 percent in excess of stoichiometric. Optimum properties in cured polyepoxide compositions are achieved using about a stoichiometric amount of the mixture of amines. For purposes of stoichiometric calculations, one epoxy group:

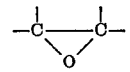

is deemed to react with one aminohydrogen.

The curing reaction involving the mixture of amines and the polyepoxides occurs when the amines and polyepoxides are admixed together and heated at elevated temperatures. Generally, the polyepoxide compositions are heated to temperatures in the range of about 35° C. to about 200° C. Temperatures which are particularly preferred are in the range of about 60° C. to about 150° C.

In those instances wherein the polyepoxide is a relatively low viscosity liquid, it is admixed directly with the mixture of amines. Polyepoxides which are too viscous for ready mixing with the mixture of amines can be heated to reduce the viscosity or liquid solvents can be added thereto in order to provide the desired fluidity. Normally solid polyepoxides are either melted or mixed with liquid solvents.

Suitable solvents for imparting the desired fluidity to highly viscous or normally solid polyepoxides are ketones, such as acetone, methyl isobutyl ketone, isophorone, and the like; esters, such as ethyl acetate, butyl acetate, ethylene glycol monoacetate, acetate of ethylene glycol monomethyl ether, and the like; ether alcohols, such as the methyl, ethyl and butyl ether of ethylene glycol or of diethylene glycol and the like; chlorinated hydrocarbons, such as trichloropropane, chloroform, and the like. Also suitable, in admixture with the solvents noted, are the aromatic hydrocarbons, such as benzene, toluene, xylene, and the like; alcohols, such as ethyl alcohol, isopropyl alcohol, n-butyl alcohol, and the like. The actual amount of solvent used will depend upon the polyepoxide being employed. If desired, rather than using solvents of the type described, or in addition thereto, reactive liquid diluents containing a single epoxy group:

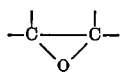

can be used in order to achieve the desired fluidity in the polyepoxides. Among such suitable reactive liquid diluents are butyl glycidyl ether, allyl glycidyl ether, phenyl glycidyl ether, and the like. In determining stoichiometric amounts with respect to the mixture of amines, the presence of "reactive" diluents is taken into account.

Additional materials, such as fillers, pigments, fibers, dyes, plasticizers, and the like can be added either to the polyepoxides or to the mixture of amines, if desired.

The polyepoxides which can be cured in accordance with the present invention are those organic compounds having an epoxy equivalency of greater than one, that is, compounds having an average of more than one vicinal epoxy group, i.e.,

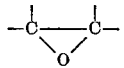

per molecule. These compounds wherein the oxygen of the epoxy group is attached to vicinal carbon atoms can be saturated or unsaturated, aliphatic, cycloaliphatic, or heterocyclic, and can be substituted, with substituents such as halogen atoms, hydroxyl groups, ether groups, and the like.

Illustrative of suitable polyepoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as bisphenols described in U.S. 2,506,486 to Bender et al., patented May 2, 1950, and polyphenylols such as the novolak condensation product of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. 2,885,385 to A. G. Farnham, patented May 5, 1959. The phenols may contain substituents such as alkyl, aryl or halogen ring substituents, as exemplified by the alkyl resorcinols, tribromoresorcinol, and the diphenols containing alkyl and halogen substituents on the aromatic ring (Bender et al., U.S. 2,506,486). The polyhydric polynuclear phenols can consist of two or more phenols connected by such groups as methylene, alkylene, or sulfone. The connecting groups are further exemplified by bis(p-hydroxyphenyl)methane, bis(p-hydroxyphenyl)dimethylmethane, and dihydroxydiphenyl sulfone.

Process for the preparation of polyglycidyl ethers of polyhydric phenols is described in detail in the Bender et al. patent (supra) and U.S. 2,801,989 to A. G. Farnham, patented Aug. 6, 1957. Among the more common polyglycidyl ethers of polyhydric phenols are polyglycidyl ether of 2,2-bis(p-hydroxyphenyl)propane and polyglycidyl ether of bis(p-hydroxyphenyl)methane. Other suitable polyglycidyl ethers of polyhydric phenols are enumerated in U.S. 2,633,458 to E. C. Shokal, patented Mar. 31, 1953.

Also suitable are the polyglycidyl ethers of polyhydric alcohols, such as the reaction products of epichlorohydrin and polyhydric alcohols for example, aliphatic compounds containing from two or four alcoholic hydroxyl groups, such as ethylene glycol, propane diols, butane diols, glycerine, hexane triols, and the like. Methods of preparing polyglycidyl ethers of polyhydric alcohols are described in U.S. 2,898,349 to P. Zuppinger et al., patented Aug. 4, 1959.

Other suitable polyglycidyl compounds are the polyglycidyl esters of polycarboxylic acids, such as the polyglycidyl esters of adipic acid, phthalic acid, and the like. Polyglycidyl esters of polycarboxylic acids are described in detail in U.S. 2,870,170 to Payne et al. patented Jan. 20, 1959. Also suitable are polyglycidyl compounds produced by reacting epichlorohydrin with aromatic amines, such as aniline, 2,6-dimethylaniline, p-toluidine, m-chloraniline, p-aminodiphenyl, m-phenylenediamine, p-phenylenediamine, 4,4'-diaminodiphenylmethane, or with amino phenols such as p-aminophenol, 5-amino-1 - naphthol,4 - aminoresorcinol, 2-methyl - 4- aminophenol, 2-chloro-4-aminophenol, and the like. Specific compounds include, among others, N,N-diglycidylaniline, N,N-diglycidyl-2,6-dimethylaniline, N,N,N', N'-tetraglycidyl-4,4' - diaminodiphenylmethane, the triglycidyl derivative of p-aminophenol wherein the amino hydrogen and OH hydrogen atoms are replaced by glycidyl groups. Polyglycidyl derivatives of aromatic amines and amino phenols and methods for their preparation are further described in U.S. 2,951,822 and 2,951,-825 to N. H. Reinking and to N. H. Reinking et al., respectively, both patented Sept. 6, 1960. The amine-curable cycloaliphatic epoxides which are obtained by epoxidation across a double bond using peracetic acid, such as bis(2,3-epoxycyclopentyl)ether and the like are also suitable.

It is to be understood that the disclosure of all patents and literature references referred to in this specification are incorporated herein by reference.

In the examples which follow, the examples being illustrative of the invention, the amines were admixed in the amounts noted and stoichiometric amounts of the mixtures combined with the polyepoxides. The mixture of amines and the compositions of the amines of polyepoxides were formulated by admixing the materials at room temperature. Amounts noted are in grams.

The compositions were subjected to tests described below.

Blush Resistance.—Steel panels, 0.030 inch thick, were coated using a draw-down blade having a clearance of about 15 mils. In each case, the coatings on each panel were cured according to the following cure cycle:

Five minutes at a temperature of 23° C.
Forty minutes at a temperature of 65° C.

Also, in each case, coatings on five additional panels were subjected to the following cure cycle:

Twenty-four hours at a temperature of 23° C.

The final thickness of each coating was 7.5 mils.

A visual inspection was made to determine the relative amount of haze and oiliness of the coated surface of each panel.

Surface characteristics.—Each composition was used to coat glass filaments which were then used to produce a filament wound pipe. Glass filaments were thoroughly coated by being passed, under tension, through a bath of the coating composition. The coated glass filaments were then wound on a steel mandrel in a helical pattern at an angle of approximately 54 degrees until a thickness of 0.10 inch was obtained. Infrared lamps were placed about one foot from the mandrel and turned on as the mandrel, with the filament-wound pipe thereon, slowly rotated. During this heating step, the temperature of the mandrel reached approximately 80° C. After the filament-wound pipe gelled, the mandrel, with the pipe thereon, was placed in an oven, which was at a temperature of 65° C., for forty minutes. The mandrel, with the pipe thereon, was then removed from the oven, cooled to about 25° C. and the pipe removed therefrom by means of a hydraulic press. The dimensions of the pipe were as follows:

| | Inches |
|---|---|
| Length | 36 |
| Inside diameter | 2.6 |
| Wall thickness | 0.1 |

The filament-wound pipe was checked for air bubbles, surface uniformity and surface smoothness.

Flexibility and Toughness.—Steel panels, 0.030 inch thick, were coated using a draw-down blade having a clearance of 15 mils. The coatings were cured according to the following cure cycle:

Five minutes at a temperature of 23° C.
Forty minutes at a temperature of 60° C.

The cured coatings were 7.5 mils thick. The flexibility and toughness of each composition were tested by bending the coated panels, with the coated side up, over a ¼ inch and a ½ inch diameter steel mandrel and checking the adhesion of the coating to the panel.

EXAMPLE 1

| | Control | | A | B | C | D |
|---|---|---|---|---|---|---|
| | 1 | 2 | | | | |
| Triethylenetetramine | 12.7 | 55 | 55 | 47.6 | 40 | 37.5 |
| Polyglycol polyamine | 0 | 0 | 45 | 52.4 | 60 | 62.5 |
| Di(3-aminopropyl)ether of diethylene glycol | 0 | 45 | 0 | 0 | 0 | 0 |
| Total amount of mixture of amines | 0 | 19 | 19 | 21.0 | 23.5 | 24.0 |
| Diglycidylether of 2,2-bis(p-hydroxyphenyl)propane epoxide equivalent weight=180 | 100 | 100 | 100 | 100 | 100 | 100 |
| Gel time, minutes | 24 | 26 | 30 | 35 | 50 | 75 |

Blush resistance

The blush resistance of Controls 1–2 was very poor. Coatings prepared from Controls 1–2 were very hazy and oily.

The blush resistance of Compositions A–D was excellent. Coatings prepared from Compositions A–D showed no oiliness.

Surface finish

The surface finish of filament-wound pipe prepared from Controls 1–2 was very poor. Surfaces were non-uniform and contained numerous air bubbles.

The surface finish of filament-wound pipe prepared from Compositions A–D was excellent. Surfaces were uniform and free of air bubbles.

Flexibility and toughness

Coatings prepared from Control 1 lost adhesion when subjected to ½ inch and ¼ inch mandrel bends.

Coatings prepared from Compositions A–D did not lose adhesion when subjected to ½ inch and ¼ inch mandrel bends.

The polyglycol polyamine of this example was di(2-aminopropyl)ether of isopropylene glycol having the formula:

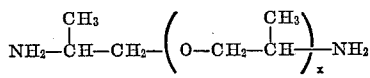

wherein $x$ is equal to 5.6 (on average).

Compositions, the formulations of which are noted below in Examples 2–6, had properties comparable to Compositions A–D of Example 1.

EXAMPLE 2

| | Amounts in grams |
|---|---|
| Diglycidylether (described in Example 1) | 100 |
| Diethylenetriamine | 8.6 |
| Polyglycol polyamine (described in Example 1) | 12.8 |

EXAMPLE 3

| | Amounts in grams |
|---|---|
| Diglycidylether (described in Example 1) | 100 |
| Tetraethylenepentamine | 10.7 |
| Polyglycol polyamine (described in Example 1) | 16.0 |

EXAMPLE 4

| | Amounts in grams |
|---|---|
| Diglycidylether (described in Example 1) | 100 |
| Triethylenetetramine | 8.2 |
| Polyglycol polyamine having the formula [1] | 12.3 |

[1] 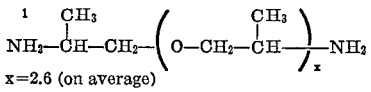
$x=2.6$ (on average)

EXAMPLE 5

| | Amounts in grams |
|---|---|
| Diglycidylether (described in Example 1) | 100 |
| Triethylenetetramine | 8.7 |
| Polyglycol polyamine falling within the scope of Formula III wherein $a+b+c=5.3$ (on average) | 13 |

EXAMPLE 6

| | Amounts in grams |
|---|---|
| Diglycidylether of bis(p-hydroxyphenyl)methane Epoxide equivalent weight=180 | 100 |
| Triethylenetetramine | 9.4 |
| Polyglycol polyamine (described in Example 1) | 14.1 |

The following polyglycol polyamines, used in the same equivalent amounts and in lieu of the polyglycol polyamine of Example 2, resulted in polyepoxide compositions having properties comparable to Compositions A–D of Example 1.

α=polyglycol polyamine falling within the scope of Formula I wherein $x=2$
β=polyglycol polyamine falling within the scope of Formula I wherein $x=5$
γ=polyglycol polyamine falling within the scope of Formula I wherein $x=15.9$ (on average)
δ=polyglycol polyamine falling within the scope of Formula I wherein $x=33$ The polyglycol polyamines of this invention are known compounds. These compounds supplied by Jefferson Chemical Company can be prepared as described in U.S. Pat. 3,236,895 to Lee et al., patented Feb. 22, 1966, and in British Pat. 942,875, complete specification published Nov. 27, 1963.

What is claimed is:
1. A mixture of an alkylene polyamine having the formula:

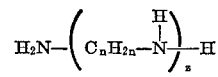

wherein $n$ is an integer of 2 to about 10 and $z$ is an integer of 1 to about 6 with a polyglycol polyamine having the formula:

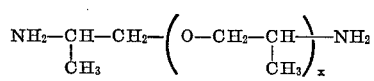

wherein $x$ has a value of 2 to about 85 or with a polyglycol polyamine having the formula:

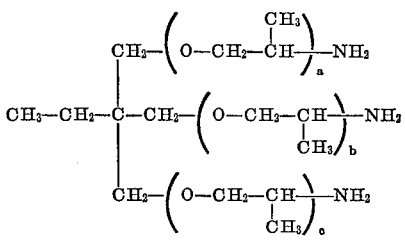

wherein $a$, $b$ and $c$ each have a value of at least 1, with the sum of $a+b+c$ being equal to 3 to about 30 wherein the polyglycol polyamine is present in an amount of about 35 percent by weight to about 75 percent by weight.

2. A mixture as defined in claim 1 wherein the polyglycol polyamine has the formula:

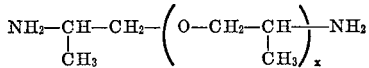

wherein $x$ has a value of 2 to about 85.

3. A mixture as defined in claim 2 wherein $x$ has a value of 2 to about 33.

4. A mixture as defined in claim 1 wherein the polyglycol polyamine has the formula:

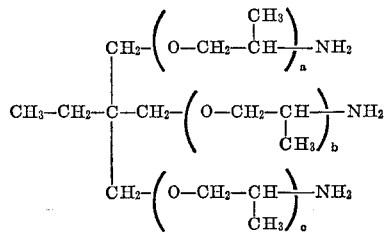

wherein $a$, $b$ and $c$ each have a value of at least 1, with the sum of $a+b+c$ being equal to 3 to about 30.

5. A mixture as defined in claim 4 wherein the sum of $a+b+c$ is equal to 3 to about 12.

6. A mixture as defined in claim 1 wherein the polyglycol polyamine is present in an amount of about 40 percent by weight to about 65 percent by weight.

7. A mixture as defined in claim 1 wherein the alkylenepolyamine is triethylenetetramine.

8. A mixture as defined in claim 1 wherein the alkyleneployamine is diethylenetriamine.

9. A mixture as defined in claim 1 wherein the alkylenepolyamine is tetraethylenepentamine.

10. A mixture as defined in claim 1 wherein the polyglycol polyamine is the di(2-aminopropyl)ether of isopropylene glycol.

11. A mixture as defined in claim 1 wherein the polyglycol polyamine has the formula:

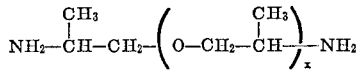

wherein $x$ has a value of about 5.6.

12. A mixture as defined in claim 1 wherein the polyglycol polyamine has the formula:

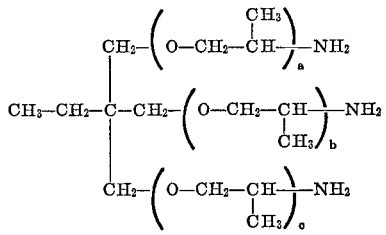

wherein the sum of $a+b+c$ is equal to about 5.3.

13. A mixture as defined in claim 1 wherein the polyglycol polyamine has the formula:

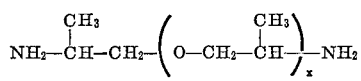

wherein $x$ has a value of about 5.6 and the alkylene polyamine is triethylenetetramine.

14. A mixture as defined in claim 1 wherein the polyglycol polyamine has the formula:

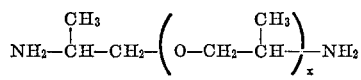

wherein $x$ has a value of about 5.6 and the alkylene polyamine is diethylenetriamine.

15. A mixture as defined in claim 1 wherein the polyglycol polyamine has the formula:

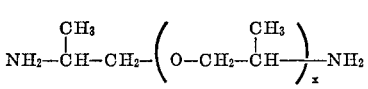

wherein $x$ has a value of about 5.6 and the alkylene polyamine is tetraethylenepentamine.

16. A mixture as defined in claim 1 wherein the polyglycol polyamine is the di(2-aminopropyl)ether or isopropylene glycol and the alkylene polyamine is triethylenetetramine.

17. A mixture as defined in claim 1 wherein the polyglycol polyamine has the formula:

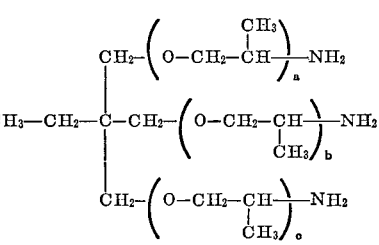

wherein the sum of $a+b+c$ is equal to about 5.3 and the alkylene polyamine is triethylenetetramine.

References Cited

UNITED STATES PATENTS

| | | | |
|---|---|---|---|
| 3,306,809 | 2/1967 | Williamson et al. | 260—47 EN |
| 3,510,339 | 5/1970 | Wile | 260—47 EN |
| 3,299,169 | 1/1967 | Smith | 260—47 EP |
| 3,377,383 | 4/1968 | Farkas et al. | 252—426 X |
| 3,591,556 | 7/1971 | Godfrey et al. | 260—47 EN |

PATRICK P. GARVIN, Primary Examiner

U.S. Cl. X.R.

260—47 EN

UNITED STATES PATENT OFFICE
CERTIFICATE OF CORRECTION

Patent No. 3,730,908          Dated May 1, 1973

Inventor(s) James R. Harvey

It is certified that error appears in the above-identified patent and that said Letters Patent are hereby corrected as shown below:

Column 4, line 43; "of" before poly should read --and--

Column 7, line 33; "ployamine" should read --polyamine--

Column 8, line 27; "or" should read --of--

Signed and sealed this 2nd day of April 1974.

(SEAL)
Attest:

EDWARD M. FLETCHER, JR.
Attesting Officer

C. MARSHALL DANN
Commissioner of Patents